United States Patent [19]

Reerink et al.

[11] 4,039,342

[45] Aug. 2, 1977

[54] FIREBRICKS

[75] Inventors: Wilhelm Reerink, Essen-Bredeney; Kurt-Guenther Beck; Heinrich Echterhoff, both of Essen; Johannes Müller, Bad Niederbreisig; Kurt Degen, Burg Brohl; Gerd Nashan, Oberhausen, all of Germany

[73] Assignee: Bergwerksverband GmbH, Essen, Germany

[21] Appl. No.: 500,667

[22] Filed: Aug. 26, 1974

Related U.S. Application Data

[62] Division of Ser. No. 367,974, June 7, 1973, abandoned, which is a division of Ser. No. 247,003, April 24, 1972, abandoned, which is a division of Ser. No. 82,607, Oct. 21, 1970, abandoned.

[30] Foreign Application Priority Data

Apr. 21, 1970 Germany .............................. 2019072

[51] Int. Cl.$^2$ ............................................. C04B 35/04
[52] U.S. Cl. ........................................ 106/58; 106/69; 202/267 R
[58] Field of Search .................... 106/58, 69; 202/96, 202/267

[56] References Cited

U.S. PATENT DOCUMENTS

| 3,024,122 | 3/1962 | McCreight et al. | 106/69 |
| 3,144,345 | 8/1964 | McCreight et al. | 106/69 |
| 3,216,838 | 11/1965 | Birch et al. | 106/69 |
| 3,378,383 | 4/1968 | Van Dreser | 106/63 |
| 3,620,783 | 11/1971 | Mahler et al. | 106/69 |
| 3,792,769 | 2/1974 | Echterhoff | 106/58 |

Primary Examiner—J. Poer
Attorney, Agent, or Firm—Michael J. Striker

[57] ABSTRACT

The output of coke ovens is increased if the brick constituting the wall between the flues and the coking chamber has a thermal conductivity matched to the rate at which the coke accepts heat. Magnesite has been found to have appropriate thermal conductivity. This material at the lower end of the coking range, namely 1200° C, is impractical due to the fact that it develops cracks and flakes off. However at the higher end of the desired coking range, namely 1300°–1400° C, these difficulties do not appear, and the use of the material leads to increased output of the furnace. More particularly according to the invention firebrick is used which has a thermal conductivity of 2.0–6.0 kcal/mh° C and is composed of 20–45% SiC, 23–57% Al$_2$O$_3$ with the remainder consisting of SiO$_2$ and traces of other oxides.

5 Claims, 2 Drawing Figures

FIREBRICKS

This is a division of application Ser. No. 367,974 filed June 7, 1973 and now abandoned which, in turn, is a division of application Ser. No. 247,003 filed Apr. 24, 1972 and now abandoned which, in turn, is a division of application Ser. No. 82,607 filed Oct. 21, 1970 and now abandoned.

BACKGROUND OF THE INVENTION

Coke ovens with a high output require that the material be subjected to a temperature of 1200° to 1400° C for about 16 to 20 hours. A further increase in the output of the coking ovens is greatly to be desired; however, in the present state of the art such an increase in output can be achieved only by raising the temperature of the system. One difficulty arises from the fact that in raising the heating flue temperature beyond 1400° C the loss in heat through radiation becomes excessive. Moreover, the life of the heating flue wall which at the present time is usually constructed of chamotte or silica firebrick is greatly reduced through the increased temperature, thus introducing an increase in cost.

SUMMARY OF THE INVENTION

It is an object of the present invention to improve the output of coking ovens. It is a further object of the invention to improve the output of said coking ovens without limiting the life of the coking ovens. It is still another object of the present invention to increase the output of the coking ovens without increasing the cost of construction. Further objects will appear as the details are presented.

The present invention is based on the discovery that the output of coke ovens can be increased by using a firebrick of increased thermal conductivity. The chamotte and silica brick mentioned above have a thermal conductivity at 1200° C of about 1°-1.5 kcal/mh° C. To implement the invention it is necessary to find a firebrick which will operate at the desired temperature without introducing deleterious side effects.

It has been found that an improved quality coke is produced at a higher rate by coking ovens when the coking chamber and the heating flue are constructed of a firebrick which has a thermal conductivity of 2°-6 kcal/mh° C and preferably 2°-4.5 kcal/mh° C. Magnesite is found to have the desired properties. More particularly the firebrick is composed of 20-45% SiC, 23-57% $Al_2O_3$ with the remainder consisting of $SiO_2$ and traces of other oxides.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
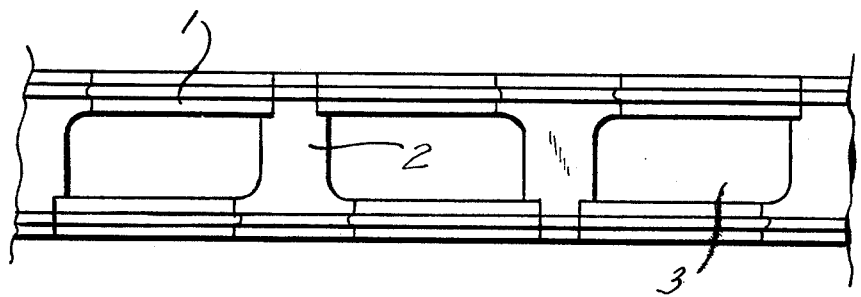
FIG. 1 is a horizontal cross-sectional view of a firebrick wall between two coking chambers.

We have found that the output of coking ovens can be improved without introduction of any attendant disadvantages if the firebrick of which the oven is constructed have an improved thermal conductivity beyond the 1-1.5 kcal/mh° C which the presently used materials have. We have also found that it is especially important that the so-called runner and header brick of the heating flue be constructed of a material of such an improved thermal conductivity. The material of which the present firebrick is constructed is for silica brick over 90% $SiO_2$; for chamotte and Sillimanite brick the composition is 40-65% of $Al_2O_3$ with the remainder being $SiO_2$. In addition most firebrick compositions have traces of metallic oxides such as $Fe_2O_3$, MgO and CaO. Some silicon carbide brick is also used which contains upwards of 50% silicon carbide.

The thermal conductivity of a 90% silicon carbide brick at 1200° C is about 13-15 kcal/Mh° C. We have found however that this silicon carbide brick, in addition to its silicon carbide content actually has some aluminium oxide and silicon oxide and in consequence is unusable in coke ovens. The reason is that it is sensitive to hydrogen so that in a coking oven it reverts to silicon dioxide and carbon which could result in complete collapse of the masonry wall in a coke oven would be harmful to the quality of the coke. The reason for this will appear below.

We have now found that an improved quality coke can be produced at a higher rate if the coking chamber and the heating flue masonry are constructed of a firebrick with a thermal conductivity at 1200° C of 2°-6 kcal/mh° C and preferably 3°-4.5 kcal/mh° C. It may also be desirable to build the foundation of the coking ovens of the same firebrick.

Thorough investigation has, as stated above, shown that an increase in the thermal conductivity of the masonry of which the coke oven walls are made to a value beyond approximately 6.5 kcal/mh° C results in a deterioration of the output of the coking operation. This is due to the fact that the thermal conductivities of the coking coal and of the coke itself are not great enough so that any given quantity of heat transferred through the wall can be accepted. To achieve satisfactory performance of the system it is necessary that the rate of heat transfer through the wall be matched to the rate at which the coking coal mass can accept the heat. As is obvious, if the thermal conductivity of the wall is too much greater than that of the charge, the coal at the surface of the wall will be grossly overheated in comparison to that at the center of the chamber. According to the invention the thermal conductivity of the masonry wall and especially of the runner brick should have a value of 2.0°-6.0 kcal/mh° C and preferably 3°-4.5 kcal/mh° C at 1200° C.

The advantages of the above discovery can be achieved by using firebrick for the runner and header bricks which contain 20-45% and preferably 30-40% silicon carbide with the remainder consisting of fire resistant material. There are a number of such brick compositions wherein the remainder consists of silicon dioxide and traces of other oxides. In addition there are compositions which contain 20-45% and preferably 30-40% silicon carbide and about 23-57% aluminium oxide as well as 21-55% silicon dioxide and traces of other oxides. In actual tests it has been shown that these firebrick materials, in contrast to the silicon carbide bricks with upwards of 50% of silicon carbide content, can be used both as flue lining and as chamber lining in coke ovens; they withstand the mechanical wear of the charge in transit as well as the effect of hydrogen, solid carbon, water vapor and gaseous hydrocarbons.

We have further found that magnesite brick is suitable as a fire-resistant material for the construction of coke ovens since its thermal conductivity falls in the desired range of 2.0°–6.0 kcal/mh° C. Magnesite brick is of course well known as a fire-resistant material. It has a high compression strength when cold and also a high maximum operating temperature limit; this makes the material suitable as a lining for the arch of industrial ovens such as those made by Siemens-Martin or for electro-ovens. On the other hand magnesite brick has only a limited resistance to temperature change and a proportionately high reversible thermal expansion as well as a limited resistance to hydration. In addition it tends to crack and scale. The cracking can be sufficiently wide-spread so that a complete collapse of the masonry can result. Magnesite brick in general is made from a low iron content sintered magnesite or from molten magnesite or from magnesium oxide. The raw material is made into brick of the desired form under a pressure of at least 1000 kg/cm$^2$. The material is then heated for a sufficient time to a temperature above 1700° C.

We have made the surprising discovery that when magnesite is used in the construction of coking ovens that the above-mentioned difficulties do not occur provided the coking is carried out in the somewhat higher range of 1300°–1400° C in which case the thermal expansion does not result in difficulties with the masonry.

Fire resistant brick made for example of chamotte or sillimanite, containing from 20–45% silicon carbide possesses a better mechanical stability than the firebrick without silicon carbide used hitherto. The same is true of the magnesite firebrick. Consequently the runner firebricks for the heating flue can be made at a thickness of about 50–65 mm. One achieves thereby an improvement in the heat transfer through the walls of the chamber and a further increase in the throughput of the oven. The runner firebricks can be made even thinner, for example, as low as 40 mm provided this is permissible with respect to the mode of construction of the heating flue wall; they can also be made as thick as 80 mm or more. On the basis of the thermal expansion it may also be desirable to construct the masonry of the foundation of the oven chamber and also of the regenerator or only the higher portions out of the firebrick according to the present invention.

As will be shown in the following examples a substantial improvement in the output of the oven can be achieved for the same coking oven dimensions and heating flue temperature when firebrick according to the present invention are used. The coke obtained thereby, as presently desired, consists essentially of small pieces which have a higher resistance to abrasion than the usual product.

The accompanying drawing shows horizontal cross-sections of two heating flues of somewhat different construction. Reference numeral 1 in both FIGS. 1 and 2 indicates the so-called runner brick which simultaneously comprises a wall for such a right and a left-hand adjacent coking chamber. Reference numeral 2 indicates the header brick which provides lateral support for the heating flue walls.

Figure 2:
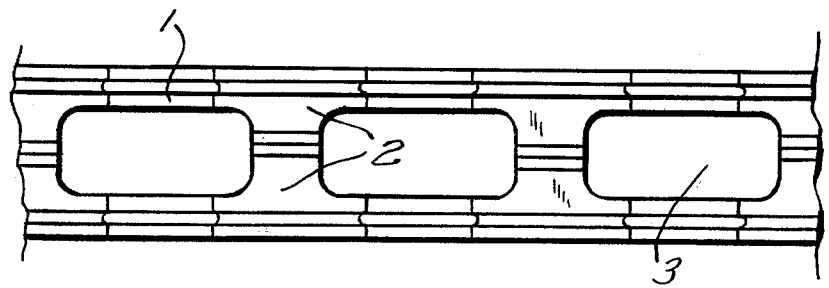
FIG. 2 is a horizontal cross-sectional view of a second construction of such a firebrick wall between two coking chambers.

Reference numeral 3 shows the heating flues. The form of the bricks as FIGS. 1 and 2 show may vary substantially. The various forms of the bricks do not comprise an immediate objective of the invention. As can be seen the bricks are held together by tongue and groove. The spaces between the stones are filled with fire-resistant cement.

The following Table 1 shows the compositions and properties of three types of bricks which have received thorough testing.

TABLE

| | Fire-resistant brick 40% SiC | brick 30% SiC | Magnesite Brick |
|---|---|---|---|
| MgO, % | 0.08 | 0.08 | 94 |
| SiO$_2$, % | 24.5 | 28.1 | 1–2 |
| Fe$_2$O$_3$, % | 0.3 | 0.3 | 0.9 |
| Al$_2$O$_3$, % | 34.4 | 39.6 | 0.5–1 |
| SiC, % | 39.0 | 30.0 | — |
| CaO | — | — | 2–3 |
| Maximum Use Temperature | ca. 1820° C | ca. 1795° C | + 1750° C |
| Thermal Conductivity | | | |
| at 500° C, kcal/mh° C | 4.5 | 4.2 | 5.0 |
| at 1000° C, kcal/mh° C | 4.2 | 3.9 | 3.0 |
| at 1200° C, kcal/mh° C | 4.1 | 3.7 | 2.5 |
| at 1400° C, kcal/mh° C | 4.0 | 3.6 | 2.2 |
| Thermal Expansion | | | |
| at 500° C, % | 0.2 | 0.2 | 0.6 |
| at 1000° C, % | 0.5 | 0.5 | 1.2 |
| at 1400° C, % | 0.65 | 0.65 | 1.9 |
| Room Temp. Density, g/cm$^3$ | 2.5 | 2.4 | 2.9 |
| Porosity, % | 9–11 | 9–11 | 19.5 |
| Cold Compressive Strength kg/cm$^2$ | 400–500 | 380–480 | 600 |

EXAMPLE

An oven chamber with a chamber thickness of 450 mm was made with a firebrick containing 40% silicon carbide (as shown in the previous Table) with a wall thickness of 108 mm. A coking coal with a volatile content of 24.8% (9% water content) was coked in this chamber at a heating flue temperature of 1300° C. The coking reaction was complete in 9½ hours. In a chamber made with the same material but with a wall thickness of only 58mm, the coking operation was complete in 7 hours.

The following Table 2 shows the outputs of coking ovens made with a variety of masonry compositions of equal dimensions.

TABLE 2

| Masonry | Silica Brick (over 90 % SiO$_2$) | | | Fire-Brick with 40% SiC | | Magnesite Brick | | | Magnesite Brick | | |
|---|---|---|---|---|---|---|---|---|---|---|---|
| Wall Thickness | 108 mm | | | 58 mm | 108 mm | 58 mm | | | 108 mm | | |
| Heating Flue Temp, ° C | 900 | 1200 | 1400 | | 1300 | 900 | 1200 | 1400 | 900 | 1200 | 1400 |
| Final Temp in Mid-Chamber, ° C | 765 | 985 | 1145 | | 1060 | 770 | 985 | 1145 | 770 | 98.5 | 1145 |
| Coking Advance, ° C | 0.90 | 3.0 | 5.5 | 10.8 | 8.9 | 1.43 | 6.7 | 10.0 | 1.18 | 4.5 | 7.5 |
| Time for Reaction Completion, h | 29–1.2 | 18 | 16 | 7 | 9½ | 17 | 9¾ | 8 | 23 | 14 | 11 |
| Coke Production Rate; kg/m$^3$/ | 18.3 | 30.6 | 33.8 | 77 | 58 | 31.7 | 56.7 | 68.8 | 26.2 | 42.4 | 54.8 |
| Volatiles Content in Coke, % | 1.29 | 0.22 | 0.14 | 0.10 | 0.11 | 0.36 | 0.2 | 0.11 | 0.6 | 0.25 | 0.13 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

We claim:

1. In a coke oven, a wall comprising firebricks which contain approximately 94 percent MgO, approximately 2 to 3 percent CaO, approximately 1 to 2 percent $SiO_2$, approximately 0.5 to 1.0 percent $Al_2O_3$ and approximately 0.9 percent $Fe_2O_3$.

2. A coke oven as defined in claim 1, wherein said firebricks have a thermal conductivity between about 2.0 and 6.0 kcal/mh° C at a temperature of 1200° C.

3. A coke oven as defined in claim 2, wherein said thermal conductivity is between about 3.0 and 4.5 kcal/mh° C at a temperature of 1200° C.

4. A coke oven as defined in claim 1, wherein said firebricks have thicknesses between substantially 40 and 80 millimeters.

5. A coke oven as defined in claim 4, wherein said firebricks have thicknesses between substantially 50 and 65 millimeters.

* * * * *